United States Patent
Nasu

(10) Patent No.: US 11,887,094 B2
(45) Date of Patent: Jan. 30, 2024

(54) AUTHENTICATION SERVER, USER TERMINAL, SETTLEMENT SYSTEM, SETTLEMENT METHOD, AND RECORDING MEDIUM

(71) Applicant: NEC Corporation, Tokyo (JP)

(72) Inventor: Yasuyuki Nasu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 17/293,116

(22) PCT Filed: Nov. 8, 2019

(86) PCT No.: PCT/JP2019/043924
§ 371 (c)(1),
(2) Date: May 12, 2021

(87) PCT Pub. No.: WO2020/100748
PCT Pub. Date: May 22, 2020

(65) Prior Publication Data
US 2022/0012706 A1    Jan. 13, 2022

(30) Foreign Application Priority Data
Nov. 14, 2018   (JP) ................................ 2018-213605

(51) Int. Cl.
*G06Q 20/20*   (2012.01)
*G06Q 20/32*   (2012.01)
*G06Q 20/40*   (2012.01)

(52) U.S. Cl.
CPC ......... *G06Q 20/206* (2013.01); *G06Q 20/209* (2013.01); *G06Q 20/322* (2013.01); *G06Q 20/40145* (2013.01)

(58) Field of Classification Search
CPC .. G06Q 20/206; G06Q 20/209; G06Q 20/322; G06Q 20/40145
See application file for complete search history.

(56) References Cited

U.S. PATENT DOCUMENTS

2003/0120555 A1   6/2003   Kitagawa
2005/0091154 A1   4/2005   Yokoyama et al.
(Continued)

FOREIGN PATENT DOCUMENTS

JP   2004-005425 A   1/2004
JP   2004-252588 A   9/2004
(Continued)

OTHER PUBLICATIONS

International Search Report for PCT Application No. PCT/JP2019/043924, dated Dec. 17, 2019.
(Continued)

*Primary Examiner* — A. Hunter Wilder
*Assistant Examiner* — Joseph M Mutschler

(57) ABSTRACT

Provided is an authentication server and the like capable of easily preventing illegal electronic settlement in a store. An authentication server 300 includes: a storage unit 2 for storing settlement destination information indicating a destination of a request for electronic settlement in a store and first face data of a salesclerk of the store in association with each other; an input unit 1 for acquiring second face data of the salesclerk of the store from a user terminal that makes the electronic settlement; an authentication unit 3 for collating the second face data that has been acquired with the first face data stored in the storage unit; and an output unit 4 for outputting the settlement destination information associated with the first face data to the user terminal based on a result of collation.

8 Claims, 13 Drawing Sheets

(56) References Cited

U.S. PATENT DOCUMENTS

2005/0211771 A1 9/2005 Onozu
2015/0317626 A1 11/2015 Ran et al.

FOREIGN PATENT DOCUMENTS

| JP | 2004252588 A | * | 9/2004 |
|----|--------------|---|--------|
| JP | 2005-276023 A | | 10/2005 |
| JP | 2005276023 A | * | 10/2005 |
| JP | 2014-035552 A | | 2/2014 |
| JP | 2014035552 A | * | 2/2014 |
| JP | 2015-179474 A | | 10/2015 |
| JP | 2017-059128 A | | 3/2017 |
| JP | 2017059128 A | * | 3/2017 |
| JP | 2018-116435 A | | 7/2018 |
| JP | 2018116435 A | * | 7/2018 |
| WO | 2001/067326 A1 | | 9/2001 |
| WO | 2014/104971 A1 | | 7/2014 |

OTHER PUBLICATIONS

English translation of Written opinion for PCT Application No. PCT/JP2019/043924, dated Dec. 17, 2019.
Japanese Office Action for JP Application No. 2018-213605 dated Dec. 9, 2019 with English Translation.
Japanese Office Action for JP Application No. 2018-213605 dated Jun. 23, 2020 with English Translation.

* cited by examiner

FIG. 3

STORE INFORMATION 12

| SALESCLERK ID | SALESCLERK NAME | FACE FEATURE INFORMATION | STORE ID | STORE NAME | SETTLEMENT DESTINATION INFORMATION |
|---|---|---|---|---|---|
| 1234 | TARO YAMADA | AAA | 1 | ** STORE | http://www.xxx...... |

THANK YOU FOR COMING OUR STORE TODAY.

PLEASE INPUT FACE IMAGE OF SALESCLERK.

IF YOU DO NOT HAVE ANY PROBLEM WITH THIS, PLEASE PRESS SUBMIT BUTTON.

SUBMIT

WELCOME TO ** STORE.

I AM PERSON IN CHARGE, TARO YAMADA.

PLEASE INPUT PAYMENT A MOUNT.

¥ ☐

AUTHENTICATION SERVER, USER TERMINAL, SETTLEMENT SYSTEM, SETTLEMENT METHOD, AND RECORDING MEDIUM

This application is a National Stage Entry of PCT/JP2019/043924 filed on Nov. 8, 2019, which claims priority from Japanese Patent Application 2018-213605 filed on Nov. 14, 2018, the contents of all of which are incorporated herein by reference, in their entirety.

TECHNICAL FIELD

The present invention relates to a settlement system and the like for preventing illegal electronic settlement.

BACKGROUND ART

Nowadays, there are various electronic settlement methods. For example, there is a service in which a two-dimensional code or a bar code presented on a store side is read by a user's mobile device such as a smartphone, and electronic settlement is made on a user side. Specifically, the user reads the two-dimensional code presented by the store with the user's smartphone, enters an amount on a displayed screen image by the user himself or herself to make electronic settlement, and shows a settlement completion screen image to a salesclerk after completing the settlement. Thus, the salesclerk understands that the payment has been completed and delivers goods to the user. The above electronic settlement service can be introduced at lower cost because there is no need to install a dedicated terminal on the store side. Furthermore, the salesclerk can check the payment by simply checking the screen image of the customer's smartphone, without touching the cash (see PTL 1).

In addition, there is a method in which at a time of transfer between individuals, a transfer destination is identified by face authentication of another party's face and thus electronic transfer is completed (see PTL 2).

CITATION LIST

Patent Literature

[PTL 1] WO 2001/067326 A
[PTL 2] JP 2017-059128 A

SUMMARY OF INVENTION

Technical Problem

However, in the method described in PTL 1, there may be a case where a destination of settlement (remittance) by the user is illegally changed by a salesclerk or the like misusing the fact that two-dimensional codes are difficult to distinguish from each other, and affixing a fake two-dimensional code on an authorized two-dimensional code, or the like.

The method described in PTL 2 is not assumed to be used in a store, and furthermore, even if a proper settlement destination is found by using face authentication, it is necessary to start up a browser and log in to Internet banking, or to transmit account information (for example, a bank name, a branch name, and a bank account number associated with a user), which requires labor, time, transfer fees, and the like of the user. Moreover, it is necessary for both sender's and receiver's terminals to be able to access the same financial institution.

The present disclosure has been made in view of the above problems, and one of purposes of the present disclosure is to provide an authentication server or the like that easily prevents illegal electronic settlement in a store.

Solution to Problem

In view of the above problems, an authentication server as a first aspect of the present disclosure includes:
a storage means for storing settlement destination information indicating a destination of a request for electronic settlement in a store and first face data of a salesclerk of the store in association with each other;
an input means for acquiring second face data of the salesclerk of the store from a user terminal that makes the electronic settlement;
an authentication means for collating the second face data that has been acquired with the first face data; and
an output means for outputting the settlement destination information associated with the first face data to the user terminal based on collation by the authentication means.

A user terminal as a second aspect of the present disclosure includes:
an image input means for acquiring face data of a salesclerk of a store when electronic settlement is made in the store;
a store information acquisition means for acquiring, from an authentication server that stores settlement destination information indicating a destination of a request for the electronic settlement and face data of the salesclerk in association with each other, the settlement destination information associated with the face data of the salesclerk, in a case where authentication of the face data is successful; and
a settlement management means for requesting the electronic settlement based on the settlement destination information and settlement information stored in the user terminal.

A settlement system as a third aspect of the present disclosure includes:
the authentication server;
the user terminal; and
as a destination of a request for electronic settlement, a settlement server that executes the electronic settlement between a store managed by the authentication server and the user terminal.

A settlement method as a fourth aspect of the present disclosure includes:
acquiring, from a user terminal that makes electronic settlement in a store, second face data of a salesclerk of the store;
collating first face data included in a storage means for storing settlement destination information indicating a destination of a request for the electronic settlement and the first face data of the salesclerk in association with each other, with the second face data that has been acquired; and
outputting the settlement destination information associated with the face data of the salesclerk to the user terminal based on the collation.

A program as a fifth aspect of the present disclosure enables a computer to perform:
acquiring, from a user terminal that makes electronic settlement in a store, second face data of a salesclerk of the store;

collating first face data included in a storage means for storing settlement destination information indicating a destination of a request for the electronic settlement and the first face data of the salesclerk in association with each other, with the second face data that has been acquired; and outputting the settlement destination information associated with the face data of the salesclerk to the user terminal based on the collation.

A program as a sixth aspect of the present disclosure enables a computer to perform:

acquiring face data of a salesclerk of a store when electronic settlement is made in the store;

acquiring, from an authentication server that stores settlement destination information indicating a destination of a request for the electronic settlement and face data of the salesclerk in association with each other, the settlement destination information associated with the face data of the salesclerk, in a case where authentication of the face data is successful; and requesting the electronic settlement based on the settlement destination information and settlement information stored in a user terminal.

Such a program may be stored on a non-transitory computer-readable storage medium.

Advantageous Effects of Invention

According to the present disclosure, it is possible to provide an authentication server or the like that easily prevents illegal electronic settlement in a store.

BRIEF DESCRIPTION OF DRAWINGS

FIG. 3 is a diagram illustrating an example of a data configuration of store information.

EXAMPLE EMBODIMENT

Figure 1:
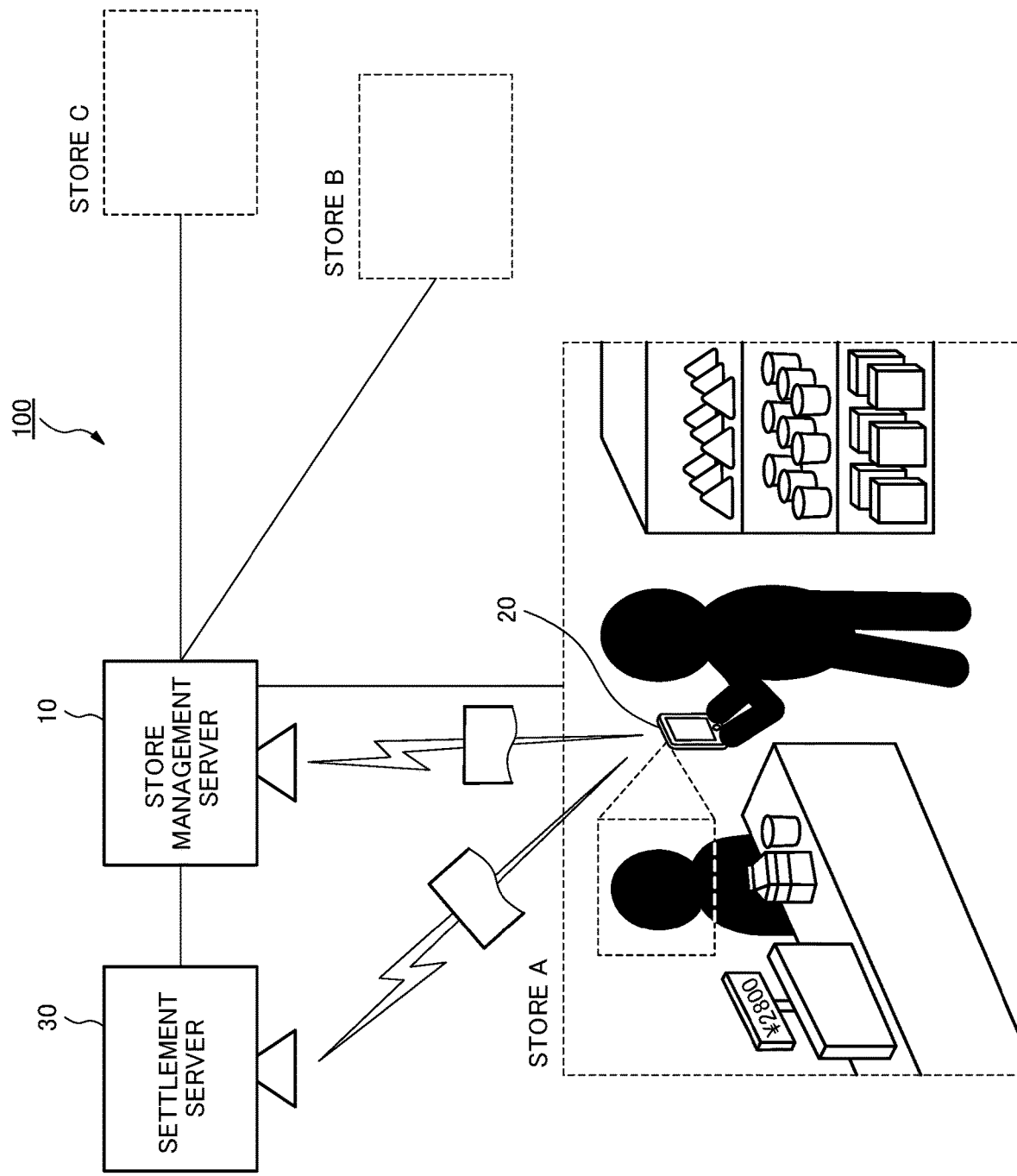
FIG. 1 is a diagram illustrating an example configuration of a settlement system according to a first example embodiment of the present disclosure.

Hereinafter, each example embodiment will be described in detail with reference to the drawings. In the following descriptions of the drawings, the same or similar elements are denoted by the same or similar reference numerals. However, the drawings schematically illustrate configurations in example embodiments of the present invention. Furthermore, the example embodiments of the present invention described below are merely examples, and can be modified as appropriate to the extent that the essence of such modification is identical to that of the present invention.

In each example embodiment, face data refers to feature information extracted from a face image, or the face image. In the following description, a case will be described where the feature information is adopted as the face data.

First Example Embodiment

Settlement System

A settlement system 100 in a first example embodiment will be described with reference to FIG. 1. The settlement system 100 includes an authentication server 10, a user terminal 20, and a settlement server 30. The authentication server 10 may manage information on a plurality of stores (stores A, B, and C). Hereinafter, the authentication server 10 is referred to as a store management server 10. There may be a plurality of user terminals 20. The store management server 10 and the user terminal 20 can be connected through wireless data communication or the like. The settlement server 30 and the user terminal 20 can be connected through wireless data communication or the like. These wireless data communications and the like may be connected via the Internet or the like. The store management server 10 and the settlement server 30 are connected by wired communication or wireless communication via the Internet or the like. The connection may be achieved by a dedicated line.

The user terminal 20 is a mobile communication terminal (for example, a smartphone) held by a user who makes electronic settlement, and when electronic settlement is made in a store, a face image of a salesclerk of the store is captured and transmitted to the store management server 10. The store management server 10 checks whether the transmitted face image is an image of a salesclerk belonging to the store, and when it is an image of a salesclerk belonging to the store, the store management server 10 transmits, to the user terminal 20, information on a destination of a request for electronic settlement in the store (information linkable to a settlement server of the request destination). The user terminal 20 links to the settlement server 30 on the basis of information on the destination of a request for electronic settlement in the store, delivers credit card information or the like stored in the user terminal 20 to the settlement server 30, and requests electronic settlement. The settlement server 30 is provided, for example, in a server of a credit card company, checks to which store, by whom, and for how much settlement amount, the electronic settlement is to be made, and then executes electronic settlement to the store from the user terminal 20. The settlement server 30 sends a result of the execution of the electronic settlement to the user terminal 20, and the user terminal 20 presents an electronic settlement completion screen image. By confirming this screen image, the salesclerk on the store side delivers purchased goods and the like to the user. The settlement server 30 may transmit the result of the execution of the electronic settlement to the store management server 10. The salesclerk may deliver the purchased goods and the like to the user after the salesclerk accesses the store management server 10 via a POS terminal or a mobile terminal owned by the salesclerk (both are not illustrated) to confirm that the electronic settlement to the store from the user terminal 20 has been completed and the payment has been made. Feature information regarding the face may be calculated from the face image of the salesclerk in an application in the user terminal 20, and be transmitted to the store management server 10. Thus, the amount of information transmitted from the user terminal 20 to the store management server 10 can be reduced.

Store Management Server

Figure 2:
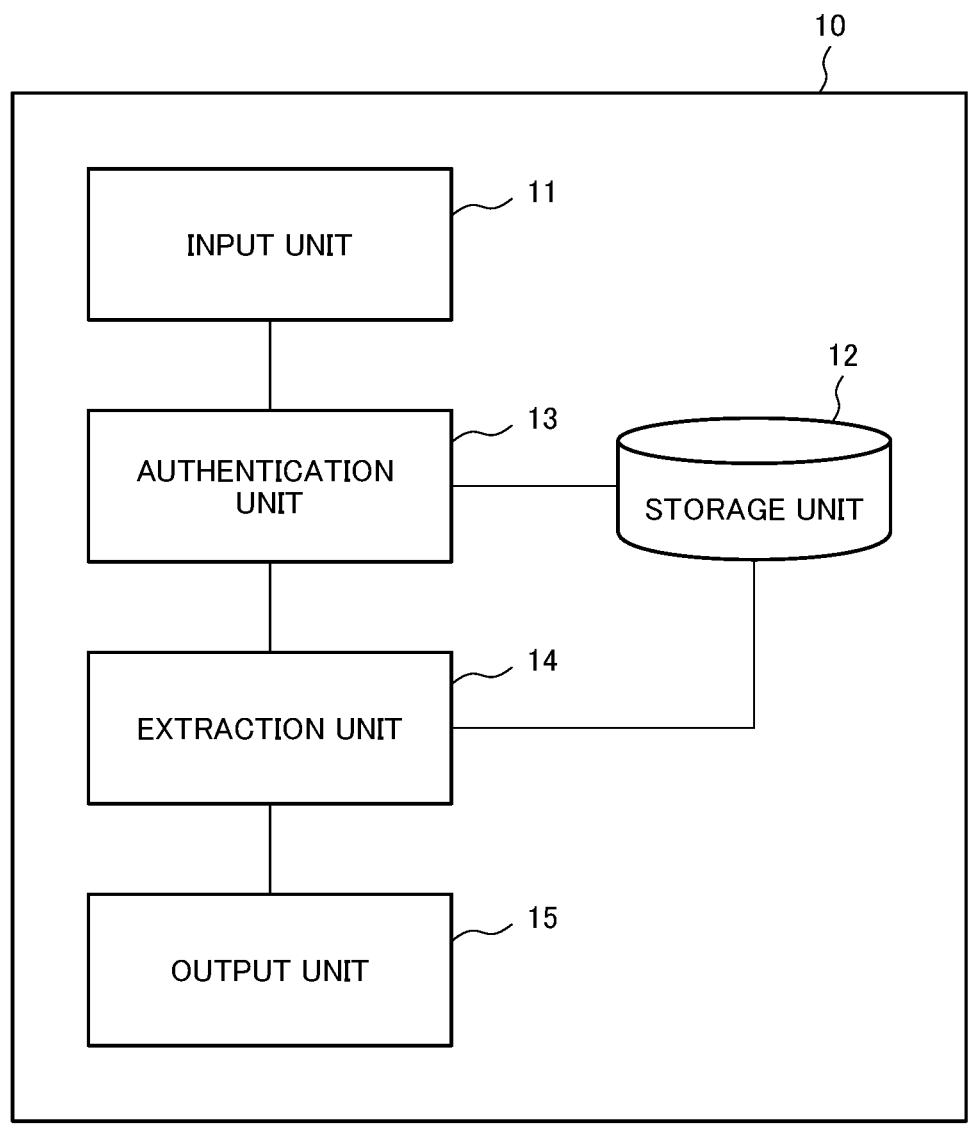
FIG. 2 is a diagram illustrating an example configuration of an authentication server.

The store management server 10 is a server for managing information on one or a plurality of stores, and includes an input unit 11, a storage unit 12, an authentication unit 13, an extraction unit 14, and an output unit 15, as illustrated in FIG. 2. The store management server 10 may be a store computer provided in a store or a server provided on a cloud.

The input unit 11 acquires a face image (also referred to as second face data) of a salesclerk of a store captured by a user terminal 20, the face image being transmitted from the user terminal 20 when electronic settlement is made in the store.

The storage unit 12 stores store information. The store information includes the feature information regarding the face (also referred to as first face data) of a salesclerk belonging to each store (there may be two or more salesclerks in each store) and information on a destination of a request for electronic settlement (link to the settlement server). The store information includes, for example, data items such as those illustrated in FIG. 3, "salesclerk identifier (ID)", "salesclerk name", "face feature information", "store ID", "store name", and "settlement destination information". The salesclerk ID is an identifier capable of uniquely identifying a salesclerk. The salesclerk name is a name of the salesclerk. The face feature information is face feature data (feature quantities, feature vectors, and the like) of the salesclerk extracted in advance. The store ID is an identifier capable of uniquely identifying a store. The store name is a name of the store. The settlement destination information is information for linking to the settlement server 30 to which settlement is requested (information on the destination of a request for electronic settlement), and is, for example, a uniform resource locator (URL). The settlement destination information is not limited to the URL, and any information that can reach the settlement server 30 may be used. A destination of the link is desirably in a state where electronic settlement by the user terminal 20 can be made immediately.

The authentication unit 13 extracts the feature information from the face image acquired by the input unit 11, and collates the extracted feature information with face feature information out of the store information stored in the storage unit 12. For example, it is determined by collation whether the extracted feature information and the face feature information coincide with each other. If these pieces of information coincide with each other, authentication is successful, and if not, authentication is unsuccessful. Whether the authentication is successful or unsuccessful may be determined on the basis of the degree of similarity between the extracted feature information and the face feature information.

In a case where the authentication is successful, the extraction unit 14 extracts store information including the settlement destination information from the storage unit 12.

The output unit 15 outputs the extracted settlement destination information to the user terminal 20.

User Terminal

Figure 4:
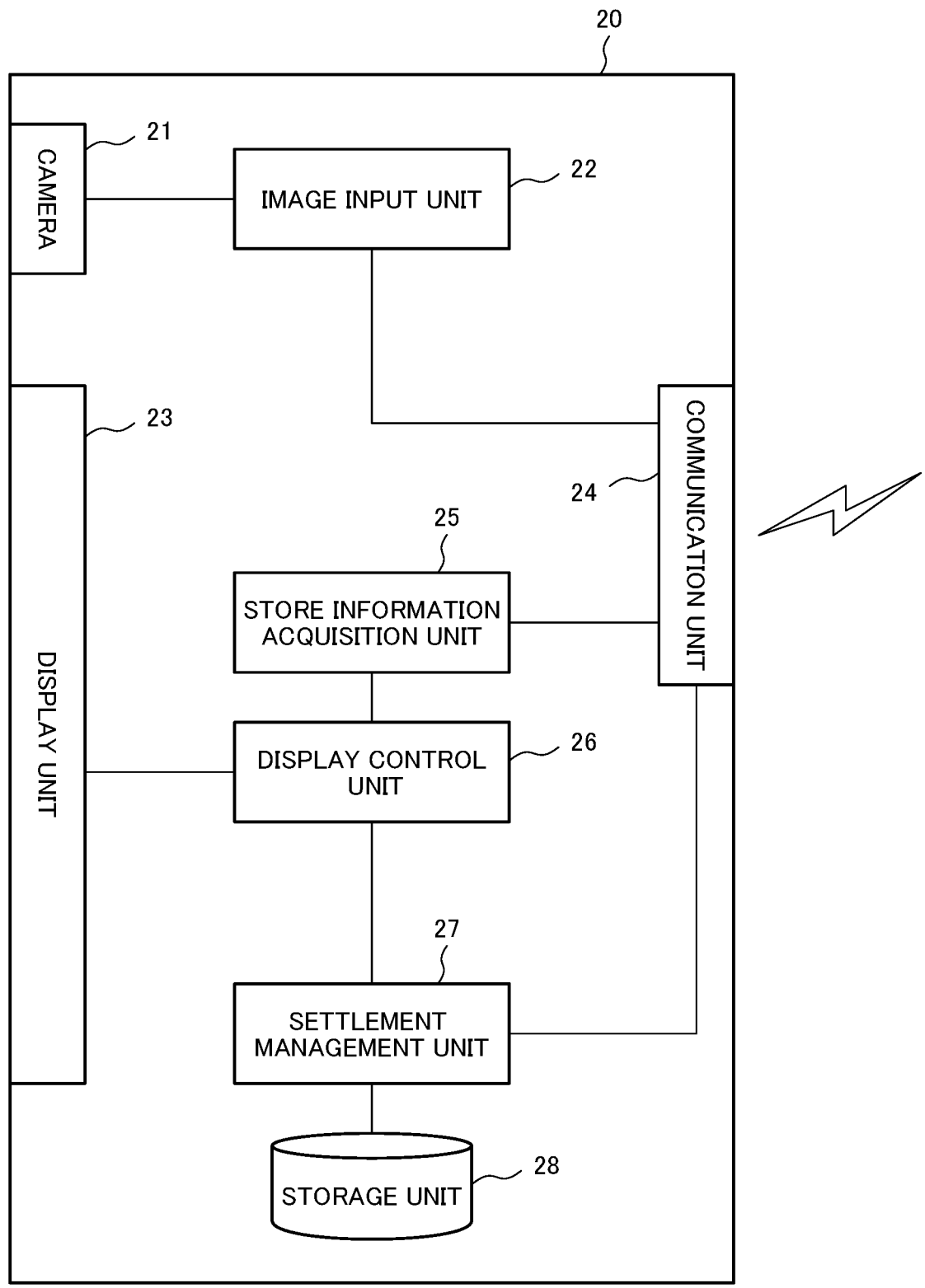
FIG. 4 is a diagram illustrating an example configuration of a user terminal.

The user terminal 20 is a mobile communication terminal held by a user who makes electronic settlement, and includes a camera 21, an image input unit 22, a display unit 23, a communication unit 24, a store information acquisition unit 25, a display control unit 26, a settlement management unit 27, and a storage unit 28, as illustrated in FIG. 4.

The camera 21 captures a face image or the like of a salesclerk.

The image input unit 22 acquires a face image of a salesclerk of a store captured by the camera 21 and delivers the face image to the communication unit 24 when the user terminal 20 makes electronic settlement in the store.

The display unit 23 is a display or the like for displaying information to the user.

The communication unit 24 performs wired communication or wireless communication for transmitting and receiving data between the user terminal 20 and the outside (for example, the store management server 10 and the settlement server 30). For example, when requesting the authentication of a face image received from the image input unit 22, the communication unit 24 transmits the face image to the store management server 10 of an external network or receives an authentication result and the settlement destination information from the store management server 10.

The store information acquisition unit 25 acquires store information including settlement destination information linked to the store (see FIG. 3) in a case where the authentication of the face image is successful in the store management server 10.

The display control unit 26 presents an image to the user via the display unit 23, and acquires information input on the image via a touch panel or a software keyboard (not illustrated).

The settlement management unit 27 requests electronic settlement to the settlement server 30 on the basis of information on the destination of a request for electronic settlement in the store and settlement information (described later) stored in the storage unit 28.

The storage unit 28 stores user-specific information necessary for settlement (settlement information), such as bank account information, credit card information, and electronic money information.

Operation of Settlement System

Figure 5:
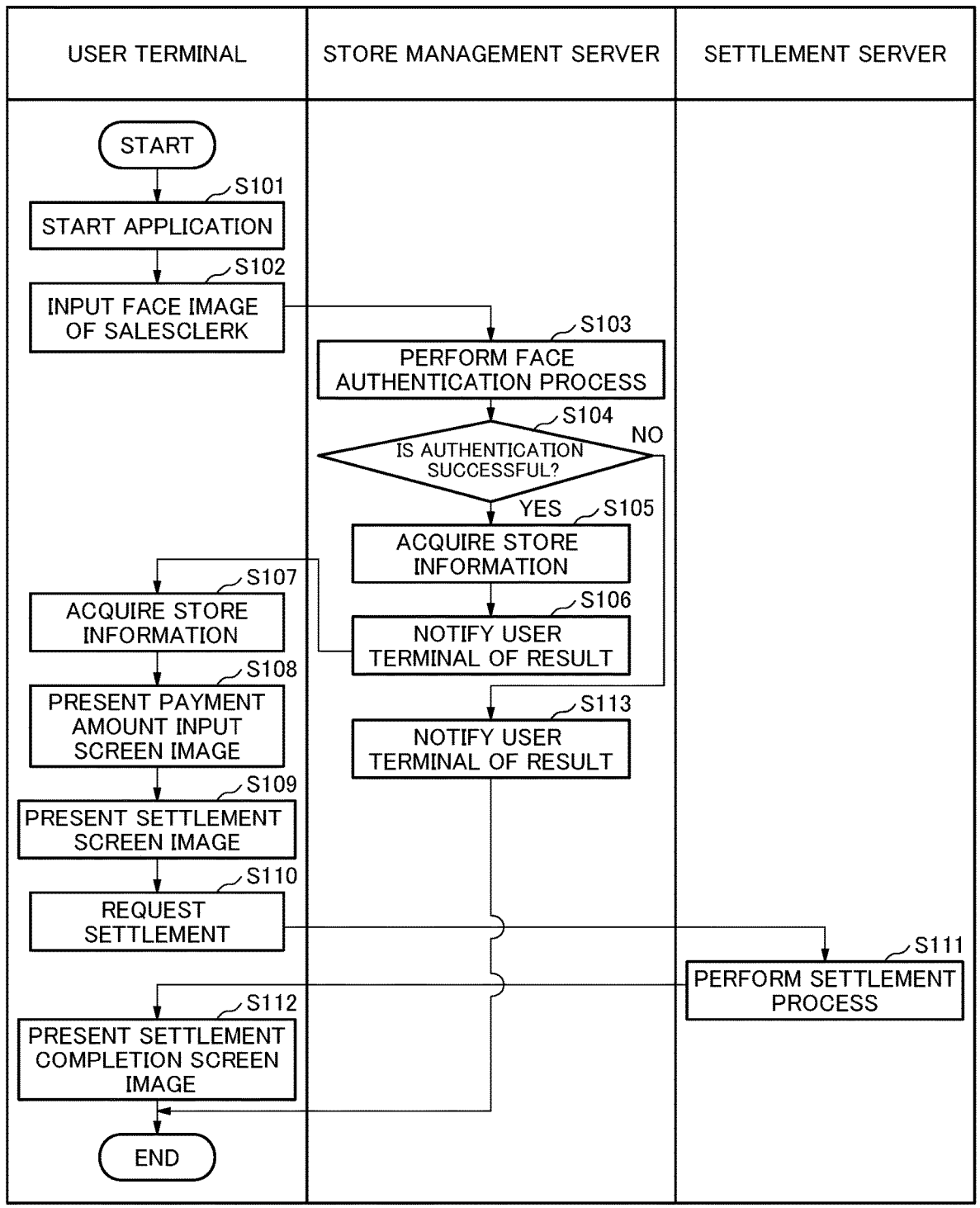
FIG. 5 is a flowchart illustrating an example operation of the settlement system according to the first example embodiment of the present disclosure.

Next, an operation of the settlement system 100 according to the first example embodiment will be described with reference to a flowchart illustrated in FIG. 5.

First, in step S101, the user terminal 20 starts an application for executing settlement by an operation from the user. At that time, the display control unit 26 presents a screen image such as that illustrated in FIG. 6 on the display unit 23, and prompts the user to capture a face image of a salesclerk using the camera 21.

Figures 6, 7, 8:
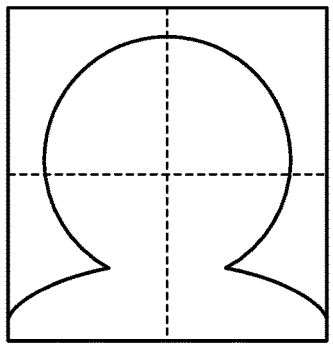
FIG. 6 is an example of a screen view presented on the user terminal.
FIG. 7 is an example of a screen view presented on the user terminal.
FIG. 8 is an example of a screen view presented on the user terminal.

In step S102, the display control unit 26 of the user terminal 20 presents a screen image such as that illustrated in FIG. 7 on the display unit 23 to cause the captured face image of the salesclerk to be confirmed. When the confirmation is completed, the image input unit 22 transmits the captured face image to the store management server 10 via the communication unit 24. In order to protect the privacy of the salesclerk, the image input unit 22 may perform erasure or the like after the transmission of the face image in such a way that the face image of the salesclerk does not remain in the user terminal 20.

In step S103, when receiving the face image, the input unit 11 of the store management server 10 delivers the face image to the authentication unit 13. The authentication unit 13 extracts feature information regarding face from the acquired face image. Furthermore, the authentication unit 13 collates the extracted feature information with the feature information stored in the store information in the storage unit 12. If these pieces of information are determined to coincide with each other by the collation, authentication is successful, and if not, authentication is unsuccessful.

If the authentication is successful in step S104, the process proceeds to step S105, and if the authentication is unsuccessful, the process proceeds to step S113. In step S113, only the fact that the authentication is unsuccessful is transmitted to the user terminal 20, and the process is ended. When the fact of the unsuccessful authentication is presented to the user, the display control unit 26 may present information prompting the user to re-capture and transmit the face image of the salesclerk.

In step S105, the extraction unit 14 extracts the store information including the settlement destination information from the storage unit 12.

In step S106, the output unit 15 notifies the user terminal 20 of a result of the authentication. At that time, the output unit 15 transmits the authentication result to the user terminal 20, together with the store information extracted by the extraction unit 14.

If the authentication is successful, in step S107, when the store information acquisition unit 25 of the user terminal 20 acquires the store information including the settlement destination information associated with the store, the store information acquisition unit 25 delivers the store information to the display control unit 26.

In step S108, the display control unit 26 prompts the user to input a payment amount. The display control unit 26 presents a screen image for inputting the payment amount such as that illustrated in FIG. 8 on the display unit 23 using, for example, the store name and the salesclerk name included in the store information, and prompts the user to input the payment amount.

Figure 9:
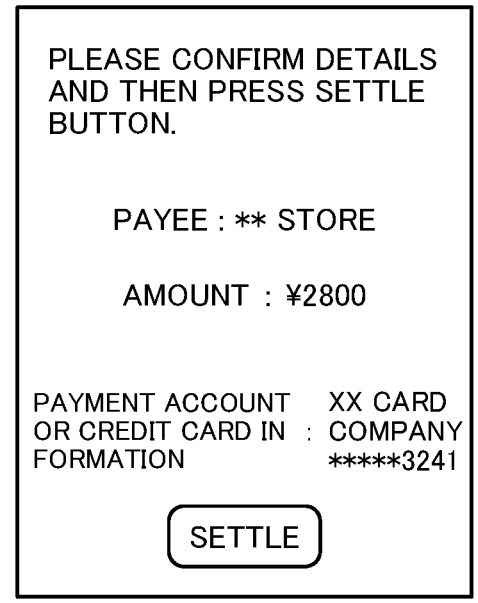
FIG. 9 is an example of a screen view presented on the user terminal.

In step S109, when the user inputs the payment amount via the touch panel or the like of the display unit 23, the display control unit 26 acquires and delivers the payment amount to the settlement management unit 27. The settlement management unit 27 generates a settlement screen image illustrated in FIG. 9. In the settlement screen image, "payee" is acquired from the store information, "amount" is acquired from the amount input from the user, and "payment account or credit card information" is acquired from the user-specific settlement information necessary for settlement (for example, bank account information and credit card information) stored in the storage unit 28. The settlement management unit 27 presents a settlement screen image on the display unit 23 and prompts the user to confirm the settlement details and touch a settle button.

In step S110, when the settle button is touched, the settlement management unit 27 transmits, via the communication unit 24, information for specifying the payee (store ID, store name, and the like) and the settlement information necessary for settlement by the user who makes the payment (for example, bank account information and credit card information) to the settlement server 30 to request a settlement process.

In step S111, the settlement server 30 executes electronic settlement between the store and the user terminal 20. The settlement server 30 transmits a result of the electronic settlement to the user terminal 20.

Figure 10:
FIG. 10 is an example of a screen view presented on the user terminal.

In step S112, the settlement management unit 27 of the user terminal 20 receives the result of the electronic settlement via the communication unit 24. The display control unit 26 presents the result to the display unit 23 as a settlement completion screen image such as that illustrated in FIG. 10.

Thus, the operation of the settlement system 100 is ended. Thereafter, the user shows the settlement completion screen image to the salesclerk, and thus receives the purchased goods and the like from the salesclerk.

Modification 1 of First Example Embodiment

In the above, the settlement management unit 27 presents an area for inputting the amount of payment in the store (see FIG. 8) on the display unit 23 of the user terminal via the display control unit 26 to prompt the user to input the payment amount, but the payment amount may be acquired by other methods.

For example, in a case where a point of sale (POS) device on the store side has a function of communication such as near-field communication (NFC), infrared communication, or the like, the settlement management unit 27 may receive the payment amount from the POS via the communication unit 24.

In addition, the image input unit 22 of the user terminal 20 may read, via the camera 21, an image of a code displayed on a sheet of paper issued by the store or on a screen (not illustrated) of the POS device on the store side and associated with a payment amount, and analyze the read image to make out the payment amount.

Modification 2 of First Example Embodiment

In the above, a total payment amount obtained after calculating the sum is input to the user terminal 20 by manual input or the like. However, the user terminal 20 may be provided with a POS function for reading a price from a bar code attached to goods or a function for reading a price by recognizing the shape of goods, via the camera 21, and the total payment amount may be calculated in the user terminal 20. In that case, the user terminal 20 presents the payment amount on the display unit 23 and prompts the user to confirm the amount.

Modification 3 of First Example Embodiment

In the above, the store management server 10 acquires the face image or the feature information regarding the salesclerk from the user terminal 20. However, a server different from the store management server may be provided in the store, the user terminal 20 may transmit the face image or the feature information regarding the salesclerk to the server, and the server may transmit the face image or the feature information to the store management server 10. That is, the store management server 10 may acquire the face image or the feature information regarding the salesclerk from the server.

Effect of First Example Embodiment

According to the settlement system 100 of the first example embodiment, illegal electronic settlement can be easily prevented in a store. This is because the store management server 10 acquires, from the user terminal 20 that makes electronic settlement in a store, a face image of a salesclerk of the store, and transmits store information including settlement destination information to the user terminal 20 in a case where face authentication is successful. Moreover, this is because the user terminal 20 accesses the settlement server 30 using the settlement destination information, and requests electronic settlement.

Second Example Embodiment

In the first example embodiment, the case of a small-scale store such as an individual store is supposed, and it is assumed that the salesclerk belongs to one store. However, in large-scale stores (for example, supermarkets and convenience stores) to which multiple salesclerks belong, some salesclerks work at (belong to) a plurality of stores. Therefore, in a second example embodiment, a case will be described in which a salesclerk working at a plurality of stores, or the like, is involved, and face authentication and a settlement process are performed using a face image of the salesclerk on the basis of work schedules of salesclerks.

Settlement System

Figure 11:
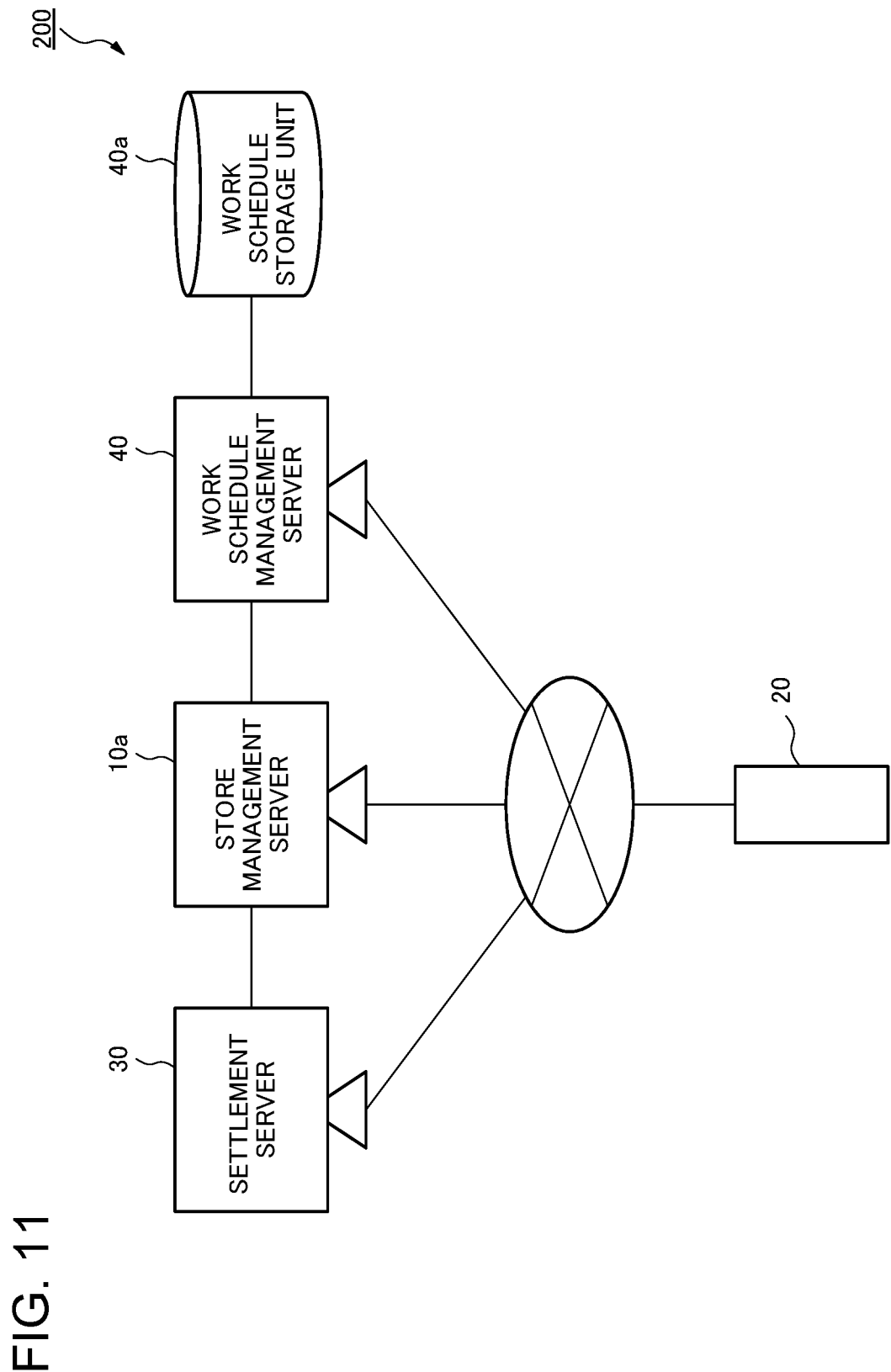
FIG. 11 is a diagram illustrating an example configuration of a settlement system according to a second example embodiment of the present disclosure.

A settlement system 200 in the second example embodiment will be described with reference to FIG. 11. The settlement system 200 includes a store management server 10a, the user terminal 20, the settlement server 30, and a work schedule management server 40.

Figure 12:
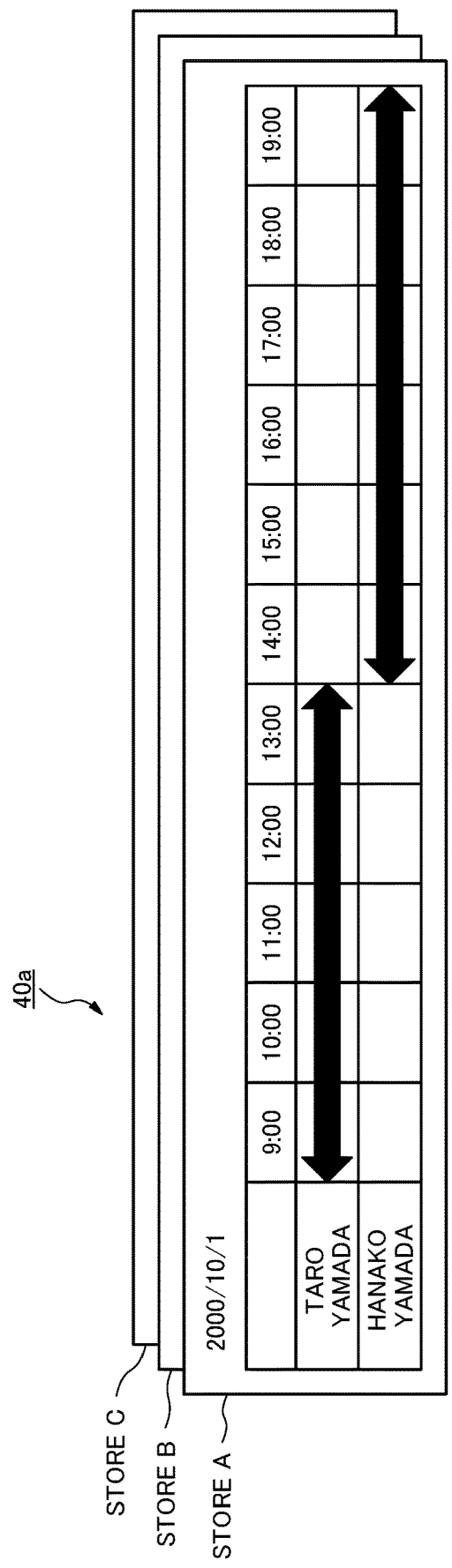
FIG. 12 is a diagram illustrating an example of a work schedule.

The work schedule management server 40 manages work schedules of salesclerks belonging to a plurality of stores managed by the store management server 10a. The work schedule management server 40 is communicably connected to a work schedule storage unit 40a. The work schedule storage unit 40a stores work schedules of salesclerks in each of a plurality of stores (stores A, B, and C) (see FIG. 12).

The work schedules may be collectively registered and updated on the store side, or each salesclerk may register the salesclerk's work schedule via a mobile communication terminal owned by the salesclerk.

Figure 13:
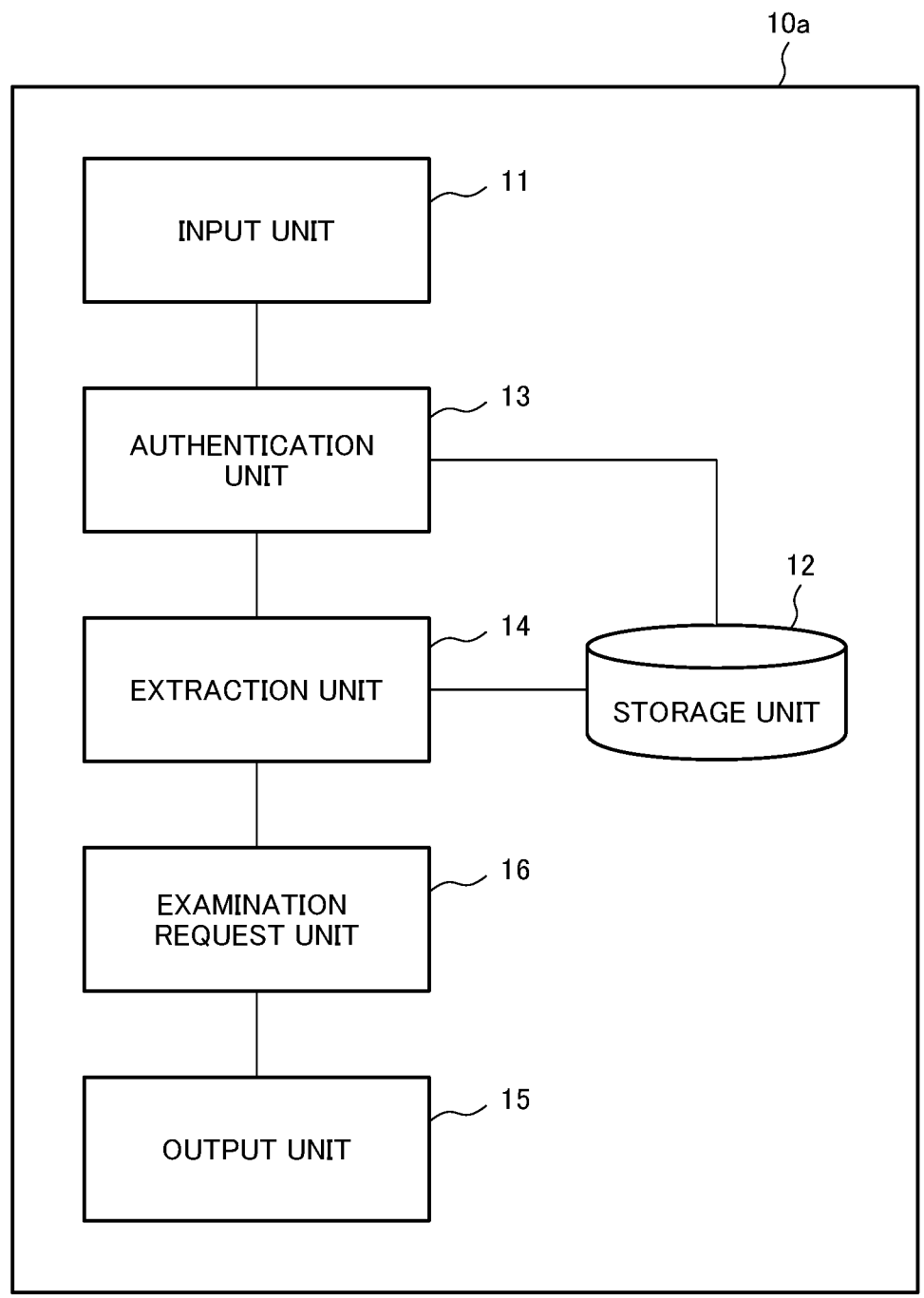
FIG. 13 is a diagram illustrating an example configuration of an authentication server.

As illustrated in FIG. 13, the store management server 10a includes the input unit 11, the storage unit 12, the authentication unit 13, the extraction unit 14, the output unit 15, and an examination request unit 16.

The examination request unit 16 transmits, to the work schedule management server 40, a request for examination as to whether a time of acquisition of a face image of a salesclerk is included in a working time zone of the salesclerk together with information capable of identifying the salesclerk (for example, salesclerk ID and salesclerk name). Moreover, in a case where there is notification from the work schedule management server 40 that the reception time is included in the working time zone of the salesclerk, the examination request unit 16 notifies the output unit 15 of that effect, and in a case where there is notification from the work schedule management server 40 that the reception time is not included in the working time zone of the salesclerk, the examination request unit 16 notifies the output unit 15 of an error message (for example, "The information on the salesclerk is not correct. Please check the salesclerk and transmit the image again."). Regarding the above determination as to whether such a time is included in the working time zone of the salesclerk, there is no limitation to the time of reception of the face image of the salesclerk. For example, it may be a time of capturing the face image of the salesclerk by the user terminal 20. These times can be obtained by using a time stamp function of an operating system of the user terminal 20 or the store management server 10a.

The other components, the user terminal 20, and the like are similar to those of the first example embodiment.

Operation of Settlement System

Figure 14:
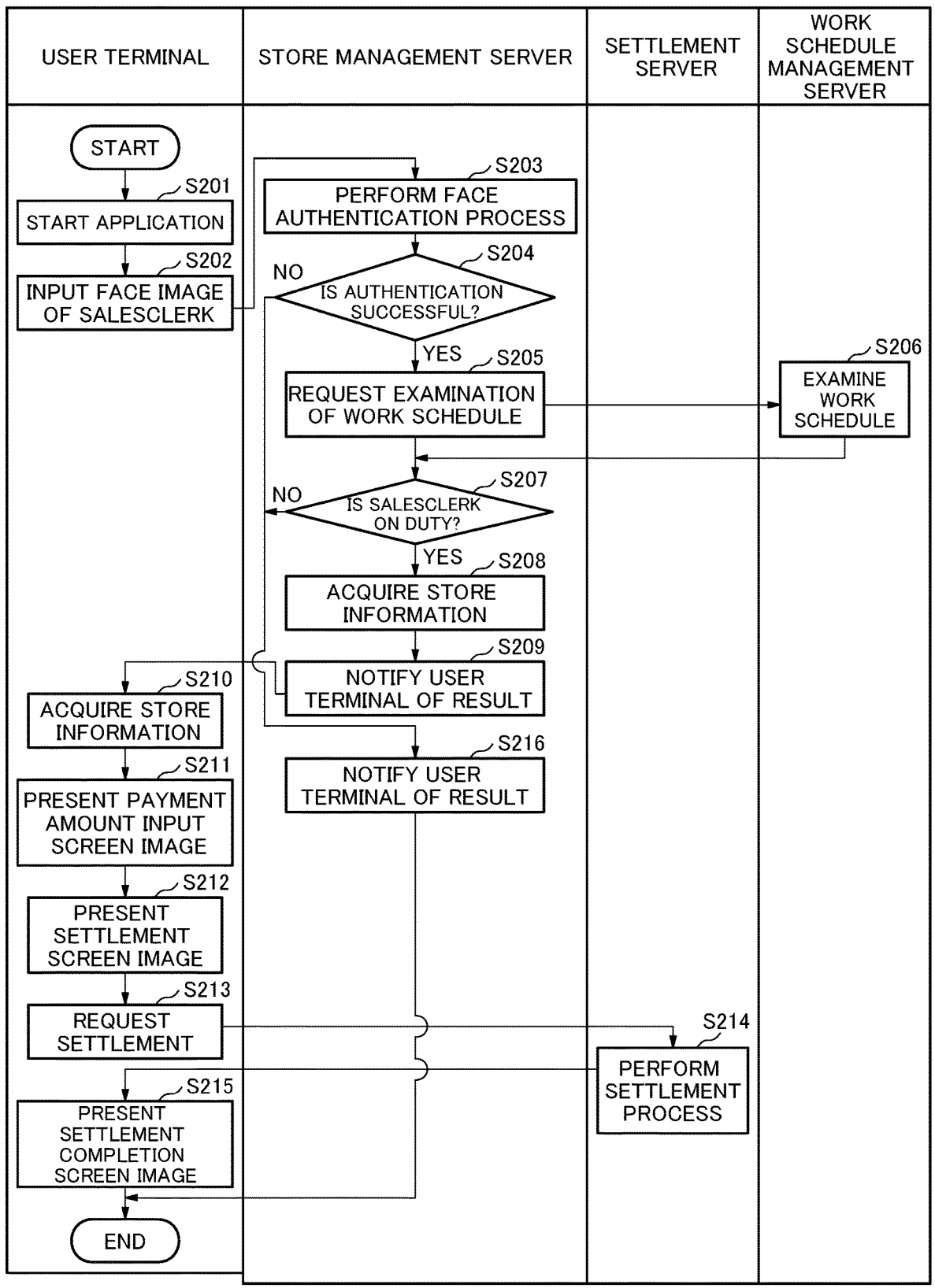
FIG. 14 is a flowchart illustrating an operation of the settlement system according to the second example embodiment of the present disclosure.

Next, an operation of the settlement system 200 according to the second example embodiment will be described with reference to a flowchart illustrated in FIG. 14.

First, steps S201 to S204 are similar to steps S101 to S104 of the first example embodiment.

In step S205, the examination request unit 16 of the store management server 10a transmits, to the work schedule management server 40, a request for examination as to whether the reception time is included in the working time zone of the salesclerk, together with information capable of identifying the salesclerk from the face image that has been successfully authenticated (for example, salesclerk ID and salesclerk name).

In step S206, when receiving the request for examination from the store management server 10a, the work schedule management server 40 retrieves the work schedule of the salesclerk from the work schedule storage unit 40a (see FIG. 12), and examines whether the salesclerk is on duty at the time of reception of the face image. The work schedule management server 40 transmits an examination result to the store management server 10a.

In step S207, the store management server 10a receives the examination result, if the examination result indicates that the salesclerk is on duty, the process proceeds to step S208, and if the examination result indicates that the salesclerk is off duty, the process proceeds to step S216.

The processes in steps S209 to S216 are similar to those in steps S106 to S113 of the first example embodiment.

Thus, the operation of the settlement system 200 is ended. Thereafter, the user shows the settlement completion screen image to the salesclerk, and thus receives the purchased goods and the like from the salesclerk.

Effect of Second Example Embodiment

According to the settlement system 200 of the second example embodiment, illegal electronic settlement can be easily prevented in a store. This is because the store management server 10a acquires, from the user terminal 20 that makes electronic settlement in a store, a face image of a salesclerk of the store, and transmits store information including settlement destination information to the user terminal 20 in a case where face authentication is successful. Furthermore, the settlement system 200 of the second example embodiment takes into consideration salesclerks who work at (belong to) a plurality of stores, and executes settlement after the store management server 10a confirms the work schedules of the salesclerks, and therefore, it is possible to easily prevent illegal electronic settlement relating to a salesclerk who is off duty. In the second example embodiment, the work schedules are managed by the work schedule management server 40, but the management may be performed by another server, such as the store management server 10*a*. In the second example embodiment, the salesclerks who work at (belong to) a plurality of stores are considered, but the configuration of the second example embodiment can also be applied to a salesclerk who belongs to one store. For example, a face image of the salesclerk captured when the salesclerk is off duty, that is, when the salesclerk is on private time, is invalidated to easily prevent illegal electronic settlement relating to the salesclerk.

Third Example Embodiment

Figure 15:
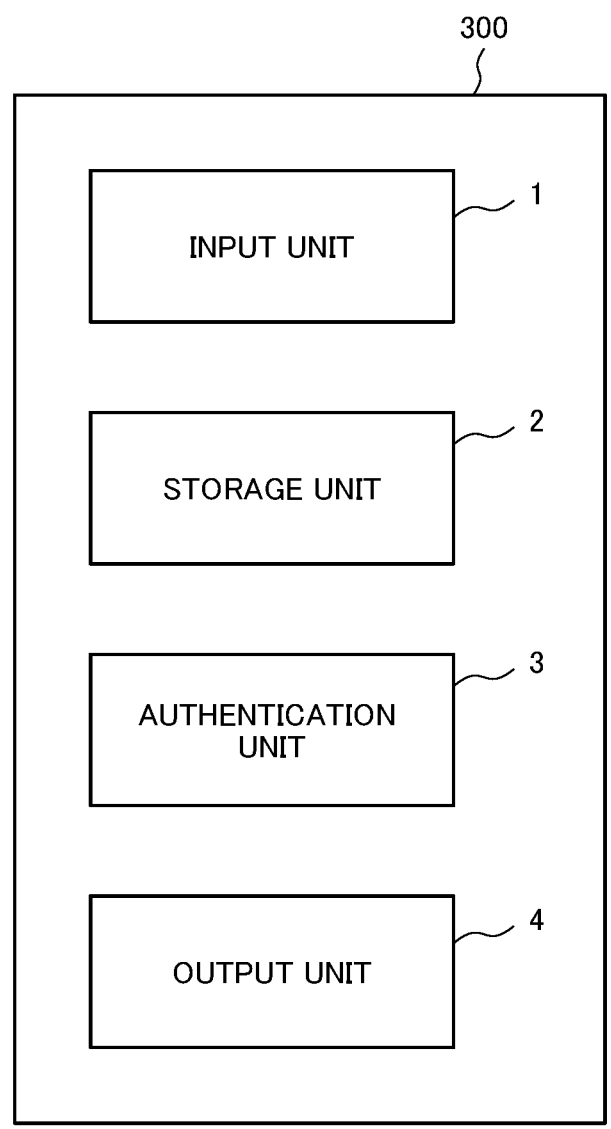
FIG. 15 is a diagram illustrating an example configuration of an authentication server according to a third example embodiment of the present disclosure.

An authentication server 300 of a third example embodiment will be described with reference to FIG. 15. The authentication server 300 includes an input unit 1, a storage unit 2, an authentication unit 3, and an output unit 4. The input unit 1 acquires, from a user terminal that makes electronic settlement in a store, face data of a salesclerk of the store. The storage unit 2 stores settlement destination information indicating a destination of a request for electronic settlement and the face data of the salesclerk in association with each other. The authentication unit 3 collates the acquired face data with the face data stored in the storage unit 2. For example, the authentication unit 3 may determine that the authentication is successful when these pieces of data are determined to coincide with each other by the collation. On the basis of the collation, for example, in a case where authentication is successful as a result of the collation, the output unit 4 outputs the settlement destination information associated with the face data of the salesclerk to the user terminal.

According to the authentication server 300 of the third example embodiment, illegal electronic settlement can be easily prevented in a store. This is because the authentication unit 3 determines that the authentication is successful when the face data acquired from the user terminal coincides with the face data stored in the storage unit in advance, and the output unit outputs the settlement destination information associated with the face data of the salesclerk to the user terminal in a case where the authentication is successful.

Information Processing Apparatus

Figure 16:
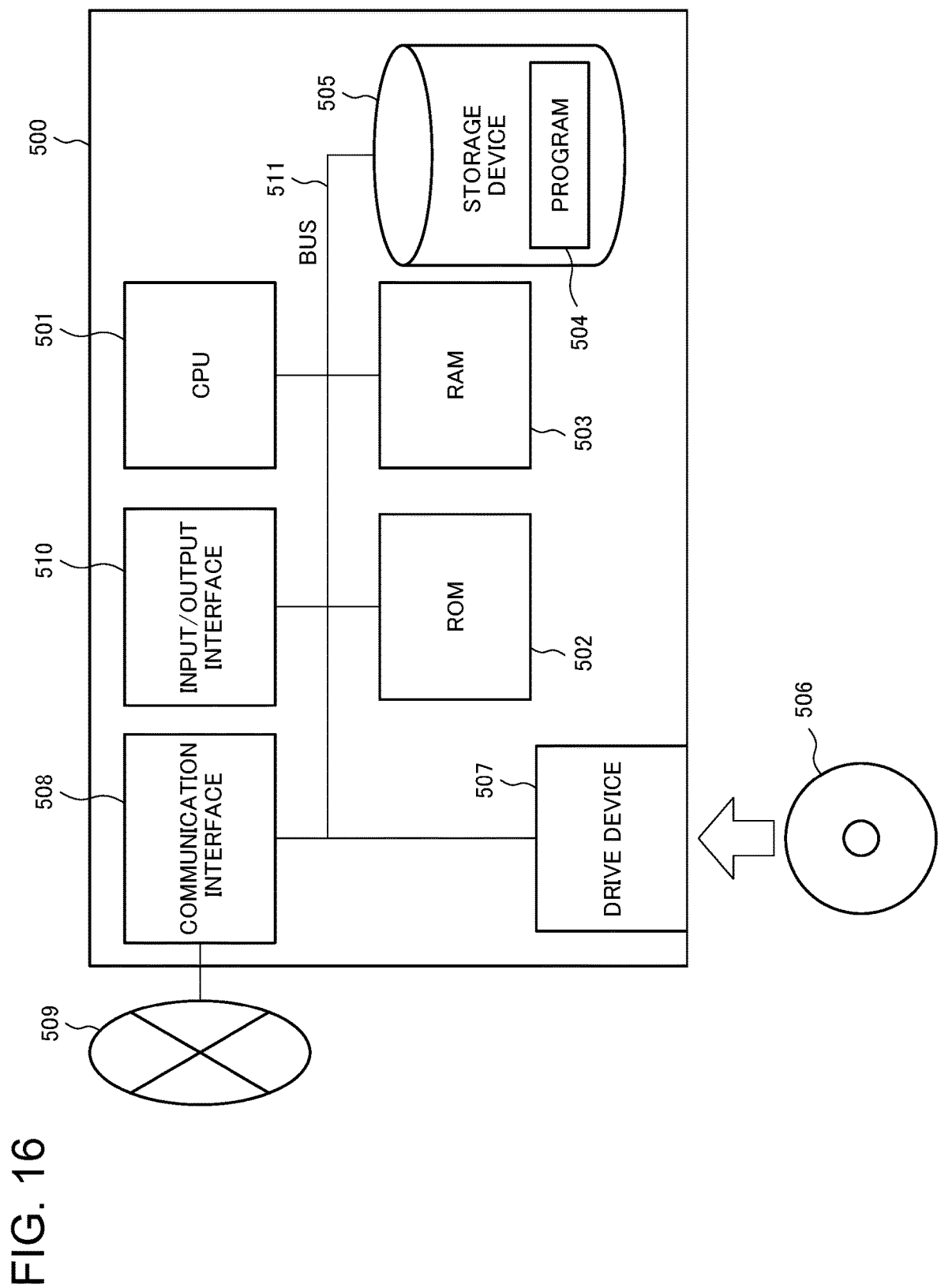
FIG. 16 is a configuration diagram of an information processing apparatus usable in the first to second example embodiments.

In each of the example embodiments of the present invention described above, some or all of the components of the settlement systems illustrated in FIGS. 1, 2, 4, 11, 13, 15, and the like can also be implemented by using any combination of an information processing apparatus 500 with a program such as that illustrated in FIG. 16, for example. The information processing apparatus 500 includes, as an example, the following configuration.

- central processing unit (CPU) 501
- read only memory (ROM) 502
- random access memory (RAM) 503
- Storage device 505 that stores a program 504 and other data
- Drive device 507 that performs reading from and writing to a recording medium 506
- Communication interface 508 that connects to a communication network 509
- Input/output interface 510 that performs data input/output
- Bus 511 that connects components The components of the settlement system in each example embodiment of the present application are implemented by the CPU 501 obtaining and executing the program 504 that achieves functions of the components. The program 504 that achieves the functions of the components of the settlement system is stored in advance, for example, in the storage device 505 or the RAM 503, and is read by the CPU 501 as necessary. The program 504 may be supplied to the CPU 501 via the communication network 509, or may be stored in advance in the recording medium 506, and the drive device 507 may read and supply the program to the CPU 501.

There are various modifications regarding a method of implementing each apparatus. For example, the settlement system may be implemented by any combination of a different information processing apparatus with a program for each of the components. Moreover, a plurality of components included in the settlement system may be implemented by any combination of one information processing apparatus 500 with a program.

Moreover, some or all of the components of the settlement system are implemented by other general-purpose or dedicated circuits, processors, or the like, or combinations thereof. These may be constituted by a single chip or a plurality of chips connected via a bus.

Some or all of the components of the settlement system may be implemented by a combination of the above-described circuit or the like with a program.

In a case where some or all of the components of the settlement system are implemented by a plurality of information processing apparatuses, circuits, or the like, the plurality of information processing apparatuses, circuits, or the like may be concentratedly arranged or dispersedly arranged. For example, the information processing apparatuses, the circuits, or the like may be implemented as a form in which each thereof is connected via a communication network, such as a client and server system, a cloud computing system, or the like.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

Some or all of the above example embodiments may also be described as the following supplementary notes, but are not limited to the following.

Supplementary Note 1

An authentication server including:
- a storage means for storing settlement destination information indicating a destination of a request for electronic settlement in a store and first face data of a salesclerk of the store in association with each other;
- an input means for acquiring second face data of the salesclerk of the store from a user terminal that makes the electronic settlement;
- an authentication means for collating the second face data that has been acquired with the first face data; and
- an output means for outputting the settlement destination information associated with the first face data to the user terminal based on collation by the authentication means.

Supplementary Note 2

The authentication server according to supplementary note 1, further including:
- an examination request means for determining whether a time of acquisition of the second face data from the user terminal is included in a working time range of the salesclerk in the store, wherein the output means outputs the settlement destination information to the user terminal in a case where the time of acquisition of the second face data is included in the working time range.

Supplementary Note 3

A user terminal including:
an image input means for acquiring face data of a salesclerk of a store when electronic settlement is made in the store;
a store information acquisition means for acquiring, from an authentication server that stores settlement destination information indicating a destination of a request for the electronic settlement and face data of the salesclerk in association with each other, the settlement destination information associated with the face data of the salesclerk, in a case where authentication of the face data is successful; and
a settlement management means for requesting the electronic settlement based on the settlement destination information and settlement information stored in the user terminal.

Supplementary Note 4

The user terminal according to supplementary note 3, wherein
the settlement management means generates a screen image including an area for inputting a payment amount in the electronic settlement, and requests the electronic settlement for the payment amount input via the screen image.

Supplementary Note 5

The user terminal according to supplementary note 3, further including:
a communication means for receiving a payment amount in the electronic settlement via communication, wherein
the settlement management means requests the electronic settlement for the payment amount received via the communication means.

Supplementary Note 6

The user terminal according to supplementary note 3, wherein
the image input means reads payment amount information on the electronic settlement included in image information regarding a print code issued by the store, and
the settlement management means requests the electronic settlement regarding the payment amount information that has been read.

Supplementary Note 7

A settlement system including:
the authentication server according to supplementary note 1 or 2; the user terminal according to any one of supplementary notes 3 to 6; and as a destination of a request for electronic settlement, a settlement server that executes the electronic settlement between a store managed by the authentication server and the user terminal.

Supplementary Note 8

The settlement system according to supplementary note 6, further including:
a work schedule management server that manages a work schedule of a salesclerk belonging to the store, wherein
the examination request means of the authentication server acquires the work schedule of the salesclerk in the store from the work schedule management server at a time of the electronic settlement, and outputs the settlement destination information to the user terminal in a case where a time of acquisition of the face data is included in the work schedule.

Supplementary Note 9

The settlement system according to supplementary note 7, wherein
the work schedule management server acquires the work schedule of the salesclerk from a terminal held by the salesclerk.

Supplementary Note 10

A settlement method including:
acquiring, from a user terminal that makes electronic settlement in a store, second face data of a salesclerk of the store;
collating first face data included in a storage means for storing settlement destination information indicating a destination of a request for the electronic settlement and the first face data of the salesclerk in association with each other, with the second face data that has been acquired; and
outputting the settlement destination information associated with the face data of the salesclerk to the user terminal based on the collation.

Supplementary Note 11

The settlement method according to supplementary note 10, wherein in a case where the first face data and the second face data coincide with each other as a result of collation,
the electronic settlement between the store and the user terminal is executed based on the settlement destination information and settlement information stored in the user terminal.

Supplementary Note 12

A storage medium that stores a program for enabling a computer to perform:
acquiring, from a user terminal that makes electronic settlement in a store, second face data of a salesclerk of the store;
collating first face data included in a storage means for storing settlement destination information indicating a destination of a request for the electronic settlement and the first face data of the salesclerk in association with each other, with the second face data that has been acquired; and outputting the settlement destination information associated with the face data of the salesclerk to the user terminal based on the collation.

Supplementary Note 13

The storage medium according to supplementary note 12, wherein in a case where the first face data and the second face data coincide with each other as a result of collation,
the electronic settlement between the store and the user terminal is executed based on the settlement destination information and settlement information stored in the user terminal.

Supplementary Note 14

A storage medium that stores a program for enabling a computer to perform:
acquiring face data of a salesclerk of a store when electronic settlement is made in the store;
acquiring, from an authentication server that stores settlement destination information indicating a destination of a request for the electronic settlement and face data of the salesclerk in association with each other, the settlement destination information associated with the face data of the salesclerk, in a case where authentication of the face data is successful; and
requesting the electronic settlement based on the settlement destination information and settlement information stored in a user terminal.

This application is based upon and claims the benefit of priority from Japanese patent application No. 2018-213605, filed on Nov. 14, 2018, the disclosure of which is incorporated herein in its entirety by reference.

REFERENCE SIGNS LIST 1 input unit
2 storage unit
3 authentication unit
4 output unit
10 store management server (authentication server)
10a store management server (authentication server)
11 input unit
12 storage unit
13 authentication unit
14 extraction unit
15 output unit
16 examination request unit
20 user terminal
21 camera
22 image input unit
23 display unit
24 communication unit
25 store information acquisition unit
26 display control unit
27 settlement management unit
28 storage unit
30 settlement server
40 work schedule management server
40a work schedule storage unit
100 settlement system
200 settlement system
300 authentication server
500 information processing apparatus
501 CPU
502 ROM
503 RAM
504 program
505 storage device
506 recording medium
507 drive device
508 communication interface
509 communication network
510 input/output interface
511 bus

The invention claimed is:

1. An authentication server comprising:
a memory storing instructions; and
one or more processors configured to execute the instructions to:
store settlement destination information indicating, in association with each other, a destination of a request for electronic settlement in a store in which no dedicated store terminal is installed, first facial feature information determined from a first facial image of a salesclerk of the store, and payee information indicating the store as a payee of the electronic settlement;
receive, from a user terminal that makes the electronic settlement, second facial feature information determined from a second facial image of the salesclerk, the second facial image captured by a camera installed in the user terminal;
perform authentication by collating the second facial feature information with the first facial feature information, wherein the authentication is successful when the second facial feature information and the first facial feature information match; and
transmit the settlement destination information including the payee information associated with the first facial feature information to the user terminal when the authentication is successful.

2. The authentication server according to claim 1, wherein:
the one or more processors are further configured to execute the instructions to:
determine whether a time at which the second facial feature information was received from the user terminal is within a working time range of the salesclerk in the store,
wherein the settlement destination information is transmitted to the user terminal in a case where the time at which the second facial feature information was received from the user terminal within the working time range.

3. The authentication server according to claim 2, wherein the one or more processors are further configured to execute the instructions to:
acquire a work schedule of the salesclerk in the store from a work schedule management server at a time of the electronic settlement, the work schedule including the working time range of the salesclerk.

4. A user terminal comprising:
a camera to capture a second facial image of a salesclerk in a store in which no dedicated store terminal is installed;
a memory storing instructions; and
one or more processors configured to execute the instructions to:
determine second facial feature information from the second facial image when electronic settlement is made in the store;
transmit the second facial feature information to an authentication server that performs authentication by collating the second facial feature information with first facial feature information determined from a first facial image of the salesclerk, wherein the authentication is successful when the second facial feature information and the first facial feature information match, and wherein the authentication server stores settlement destination information indicating, in association with each other, a destination of a request for the electronic settlement, the first facial information, and payee information indicating the store as a payee of the electronic settlement;

receive, from the authentication server, the payee information when the authentication is successful;

receive a payment amount in the electronic settlement; and initiate the electronic settlement in the payment amount to the payee indicated by the payee information.

5. The user terminal according to claim 4, wherein the one or more processors are further configured to execute the instructions to:

generate a screen image including an area for inputting the payment amount in the electronic settlement, and initiate the electronic settlement for the payment amount input via the screen image.

6. The user terminal according to claim 4, wherein the one or more processors are further configured to execute the instructions to:

receive the payment amount in the electronic settlement via communication.

7. The user terminal according to claim 4, wherein the one or more processors are further configured to execute the instructions to:

read the payment amount on the electronic settlement included in image information regarding a print code issued by the store.

8. A settlement method comprising:

storing, by an authentication server, settlement destination information indicating, in association with each other, a destination of a request for electronic settlement in a store in which no dedicated store terminal is installed, first facial feature information determined from a first facial image of a salesclerk of the store, and payee information indicating the store as a payee of the electronic settlement;

receiving, by the authentication server and from a user terminal that makes the electronic settlement, second facial feature information determined from a second facial image of the salesclerk, the second facial image captured by a camera installed in the user terminal;

performing, by the authentication server, authentication by collating the second facial feature information with the first facial feature information, wherein the authentication is successful when the second facial feature information and the first facial feature information match; and transmitting, by the authentication server, the settlement destination information including the payee information associated with the first facial feature information to the user terminal when the authentication is successful.

* * * * *